UNITED STATES PATENT OFFICE.

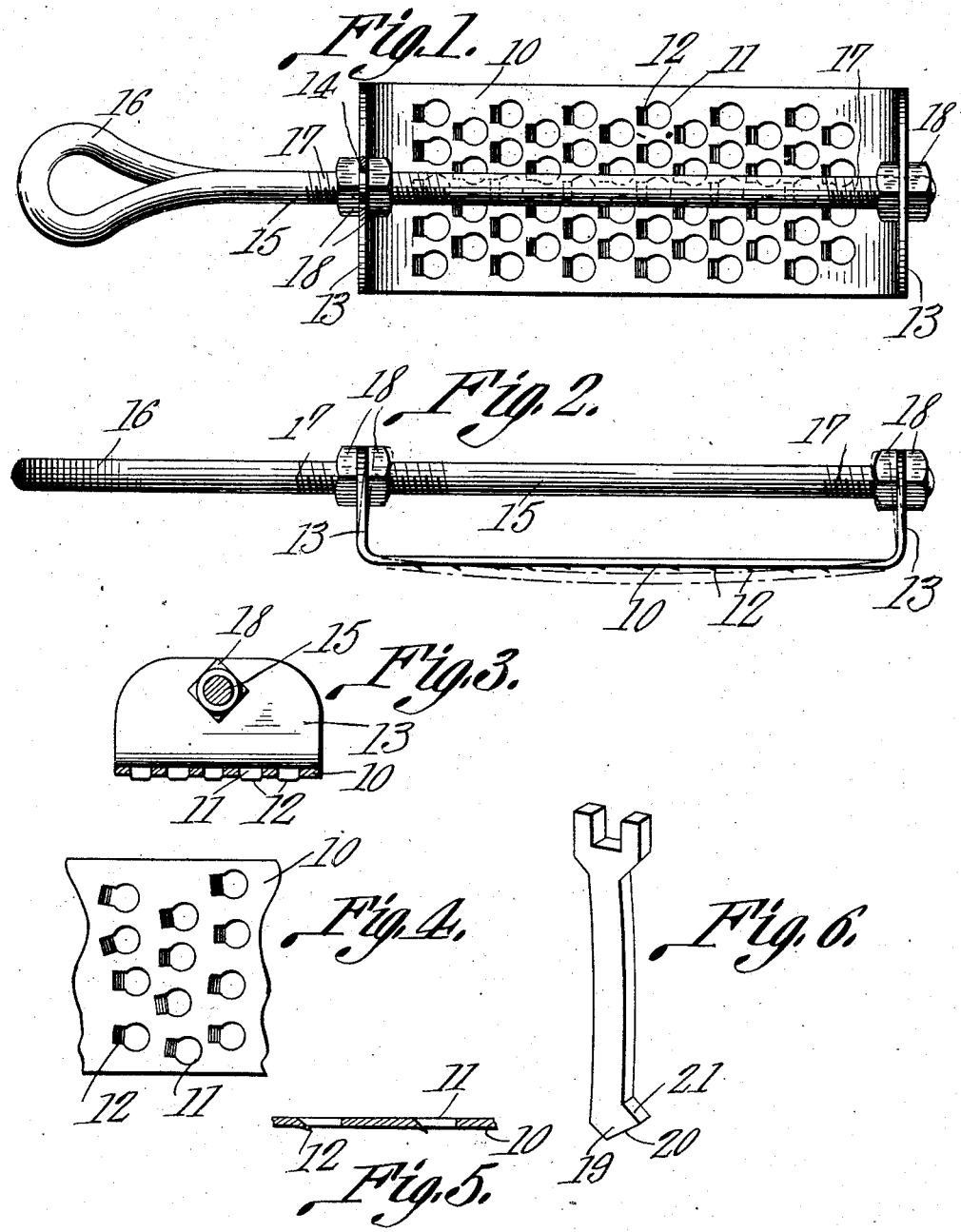

MOSES W. HARVEY, OF FORESTHILL, WEST VIRGINIA.

HOOF-PLANE.

973,780.

Specification of Letters Patent.  Patented Oct. 25, 1910.

Application filed July 6, 1910. Serial No. 570,644.

*To all whom it may concern:*

Be it known that I, MOSES W. HARVEY, a citizen of the United States, residing at Foresthill, in the county of Summers and State of West Virginia, have invented a new and useful Hoof-Plane, of which the following is a specification.

It is the object of the present invention to provide an improved construction of hoof plane. Ordinarily, a coarse rasp is employed in planing or smoothing down the hoof of an animal being shod but such implements are undesirable for the reason that they soon become clogged and do not rapidly remove the material of the hoof.

It is therefore the object of the present invention to provide a hoof plane or rasping device which will overcome the disadvantages of the ordinary rasp employed.

The device embodying the present invention consists, in part, of a plate having a number of small cutting tongues, similar in form and function to a plane bit, stamped up therefrom; and one feature of the invention resides in the provision of means for flexing this plate so that the cutting edges of the said tongues may be caused to project to a greater or less distance from the working side of the plate.

With the above and other objects in view, the invention consists in the general construction and arrangement of parts shown in the accompanying drawings, in which, Figure 1 is a plan view of the hoof plane embodying the present invention. Fig. 2 is a side elevation thereof, the plane being shown in one condition in full lines and with its plate flexed in dotted lines. Fig. 3 is a transverse sectional view through the plane looking toward one end thereof. Fig. 4 is a plan view of a portion of the scraper plate of the plane illustrating a slight modification of the form of this plate. Fig. 5 is a detail longitudinal sectional view through a portion of the scraper plate of the same. Fig. 6 is a detail perspective view of a tongue setting tool and wrench employed in connection with the plane.

In the drawings, the plane embodying the present invention includes, in its structure, a scraper plate which is indicated by the numeral 10 and, while of stout sheet metal possesses a certain degree of resiliency and flexibility which will result in its normally assuming a flat position but adapt it to be flexed to various degrees of curvature. The plate is formed with a number of openings 11 and at one side of each opening the material of the plate is struck down to afford a scraping tongue 12 the projecting edge of which is sharpened to a cutting edge. In Fig. 1 of the drawings, these tongues are illustrated as arranged in transverse series one series behind another, the tongues of adjacent series alternating.

Each end of the plate 10 is bent up substantially at right angles as at 13 and is formed with an opening 14 and through these openings is inserted the shank 15 of a handle 16. At and adjacent its points of engagement through the openings 14, the shank 15 of the handle 16 is threaded as at 17 and upon each threaded portion of the shank are nuts 18 adjustable to bear against opposite sides of the corresponding ends 13 of the plate 10. From the foregoing description of this portion of the invention, it will be readily understood that by loosening the nuts which bear against the opposed faces or sides of the ends 13 and then tightening the other nuts bearing against the outer faces of these said ends, compressed force may be brought to bear against the said ends of the plate thereby flexing or curving its body portion to a greater or less degree as shown in dotted lines in Fig. 2 of the drawings, the said body being thus curved in the direction of its length. When the body 10 of the scraper plate is in normal or flat condition, illustrated in full lines in the said Fig. 2 of the drawings, the cutting edges of the tongues 12 will project but a slight degree beneath the under side of the said body of the plate but when the body of the plate is flexed as above stated, these tongues will have their cutting edges projecting to a greater or less degree beneath the under side of the said plate, depending upon the degree of curvature to which the plate is flexed. Thus, if the plate is flexed to a considerable degree the cutting edges of the tongues 12 will project quite a distance beneath the under side of the plate and will consequently cut off larger portions of the hoof at each stroke of the plane. As heretofore stated, the tongues 12 are arranged in transverse series and in transverse alinement as shown in Fig. 1 of the drawings but they may be arranged in staggered or irregular fashion as illustrated in Fig. 4 of the drawings.

The use of the tool illustrated in Fig. 6 of the drawings, as a wrench, will be readily understood and when it is to be used in setting tongues 12 its end 19 is inserted in the opening related to the tongue to be set with its inclined edge 20 seating against the tongue, and a blow is then struck upon the shoulder 21, with a hammer or other suitable implement, to spring down the tongue.

What is claimed is:

1. A hoof plane comprising a scraper plate having upturned ends, and a handle having a shank fitted through the ends and adjustable with respect thereto, whereby to flex the plate to various degrees of curvature.

2. A hoof plane comprising a scraper plate having upturned ends, a handle having a shank engaged through openings in the said ends of the plate, the portions of the shank at and adjacent the point of engagement through the openings being threaded, and nuts threaded upon the said portions of the shank and bearing against the said upturned ends of the plate, the nuts being adjustable upon their respective threaded shank portions to exert pressure against the ends of the plate to flex the same to various degrees of curvature.

In testimony that I claim the foregoing as my own, I have hereto affixed my signature in the presence of two witnesses.

MOSES W. HARVEY.

Witnesses:
C. L. DUNN,
J. O. HUNTER.